US010853087B2

(12) United States Patent
Khatri et al.

(10) Patent No.: US 10,853,087 B2
(45) Date of Patent: Dec. 1, 2020

(54) UEFI BOOT MODE OS PROVISIONING SYSTEM

(71) Applicant: Dell Products L.P., Round Rock, TX (US)

(72) Inventors: Mukund P. Khatri, Austin, TX (US); Wei Liu, Austin, TX (US)

(73) Assignee: Dell Products L.P., Round Rock, TX (US)

(*) Notice: Subject to any disclaimer, the term of this patent is extended or adjusted under 35 U.S.C. 154(b) by 281 days.

(21) Appl. No.: 15/971,770

(22) Filed: May 4, 2018

(65) Prior Publication Data

US 2019/0339986 A1 Nov. 7, 2019

(51) Int. Cl.
| | |
|---|---|
| *G06F 9/44* | (2018.01) |
| *G06F 9/4401* | (2018.01) |
| *G06F 13/24* | (2006.01) |
| *G06F 13/42* | (2006.01) |
| *G06F 8/61* | (2018.01) |

(52) U.S. Cl.
CPC .............. *G06F 9/4406* (2013.01); *G06F 8/61* (2013.01); *G06F 9/4416* (2013.01); *G06F 13/24* (2013.01); *G06F 13/4221* (2013.01); *G06F 2213/0024* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505

See application file for complete search history.

(56) References Cited

U.S. PATENT DOCUMENTS

| | | | |
|---|---|---|---|
| 10,489,582 B1* | 11/2019 | Raman ................ | G06F 11/3612 |
| 2003/0110370 A1* | 6/2003 | Fish ......................... | G06F 9/441 |
| | | | 713/2 |

(Continued)

OTHER PUBLICATIONS

"PXE Configuration in a Mixed UEFI/Legacy Environment," Ivanti User Community, 2017, 4 Pages, Ivanti, https://community.ivanti.com/thread/32625.

(Continued)

*Primary Examiner* — Zahid Choudhury
(74) *Attorney, Agent, or Firm* — Haynes and Boone, LLP (57) ABSTRACT

A Universally Extensible Firmware Interface (UEFI) boot mode operating system (OS) provisioning system includes a pre-boot execution environment system coupled to a server device through a network. The server device boots in a UEFI boot mode. While in the UEFI boot mode, the server loads a portion of a legacy Basic Input/Output System (BIOS) compatibility support module. The loading of the portion of the legacy BIOS compatibility support module provides for the configuration of a communication subsystem in the server device to communicate with the pre-boot execution environment system via legacy BIOS communications. The server device then communicates with the pre-boot execution environment system, via the legacy BIOS communications using the communication subsystem and while in the UEFI boot mode, to retrieve UEFI boot information via a remote legacy BIOS boot mode operation, and uses the UEFI boot information to install an OS on the server device.

20 Claims, 4 Drawing Sheets

(56) References Cited

U.S. PATENT DOCUMENTS

| | | | | |
|---|---|---|---|---|
| 2006/0020780 | A1* | 1/2006 | Hobson | G06F 9/4401 |
| | | | | 713/2 |
| 2013/0290778 | A1* | 10/2013 | Soderlund | G06F 11/1417 |
| | | | | 714/15 |
| 2014/0258700 | A1* | 9/2014 | England | G06F 21/572 |
| | | | | 713/2 |
| 2016/0328564 | A1* | 11/2016 | Vidyadhara | G06F 21/575 |
| 2017/0124004 | A1* | 5/2017 | Yau | G06F 13/4282 |

OTHER PUBLICATIONS

"30.2.2. Configuring PXE Boot for EFI—Red Hat Customer Portal," 2018, 3 Pages, Red Hat, Inc., https://access.redhat.com/documentation/en-us/red_hat_enterprise_linux/6/html/installation_guide/s1-netboot-pxe-config-efi.

"Configuring PXE Boot Servers for UEFI—tianocore/tianocore.github.io/WIKI—GitHub," Mar. 16, 2018, 2 Pages, 2 Revisions, GitHub, Inc.,https://github.com/tianocore/tianocore.github.io/wiki/Configuring-PXE-Boot-Servers-for-UEFI.

\* cited by examiner

UEFI BOOT MODE OS PROVISIONING SYSTEM

BACKGROUND

The present disclosure relates generally to information handling systems, and more particularly to provisioning an operating system on an information handling system operating in a UEFI boot mode via a legacy-BIOS-boot-mode-based server system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, perform boot operations upon startup or reboot in order to perform hardware initialization and/or other booting operations known in the art. Many server devices utilize a "legacy" Basic Input/Output System (BIOS) that is provided on non-volatile firmware in the server device and that operates to perform the hardware initialization discussed above, as well as perform runtime services for operating systems and programs on the server device. As such, the BIOS may initialize and test hardware components on the server device, as well as load a boot loader or an operating system. The Universally Extensible Firmware Interface (UEFI) specification was introduced as a successor to BIOS in an effort to address some technical shortcomings of BIOS, and provides a software interface between the operating system and platform firmware in the server device. The UEFI specification provides the replacement of the BIOS firmware, while also providing limited legacy support for BIOS services (discussed in further detail below.) UEFI supports remote diagnostics and repair of server devices, even when no operating system is installed in those server devices, as well as other UEFI BIOS-improvements know in the art.

Many users have server devices that are capable of being provisioned with an operating system while operating in a UEFI boot mode, but do not enable such UEFI boot mode operating system deployment on those server devices because those server devices are deployed in a data center that utilizes a Preboot Execution Environment (PXE) that is not configured to provision operating systems via the UEFI boot mode. PXE allows networked server devices that are not yet loaded with an operating system to be configured and booted remotely by a data center administrator, but many PXE systems are configured to deploy operating systems while in a legacy BIOS-based boot mode, which requires that server devices provided in those data centers be configured in a legacy BIOS boot mode as well. As such, while many server devices are manufactured with the UEFI boot mode enabled as a default, many users still order server devices to be defaulted to the legacy BIOS boot mode, as the legacy BIOS-based PXE systems will not be able to provision operating systems on those server devices "out-of-the-box" if the server devices are defaulted to the UEFI boot mode.

Accordingly, it would be desirable to provide for UEFI boot mode OS provisioning using a legacy BIOS-based PXE system.

SUMMARY

According to one embodiment, an Information Handling System (IHS) includes a processing system; and a memory system that is coupled to the processing system and that includes instructions that, when executed by the processing system, cause the processing system to provide a Universally Extensible Firmware Interface (UEFI) engine that is configured to: boot in a UEFI boot mode; load, while in the UEFI boot mode, a portion of a legacy Basic Input/Output System (BIOS) compatibility support module, wherein the portion of the legacy BIOS compatibility support module provides for the configuration of a communication subsystem to communicate with a pre-boot execution environment system via legacy BIOS communications; communicate, with the pre-boot execution environment system via the legacy BIOS communications using the communication subsystem and while in the UEFI boot mode, to retrieve UEFI boot information via a remote legacy BIOS boot mode operation; and install, using the UEFI boot information, an operating system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
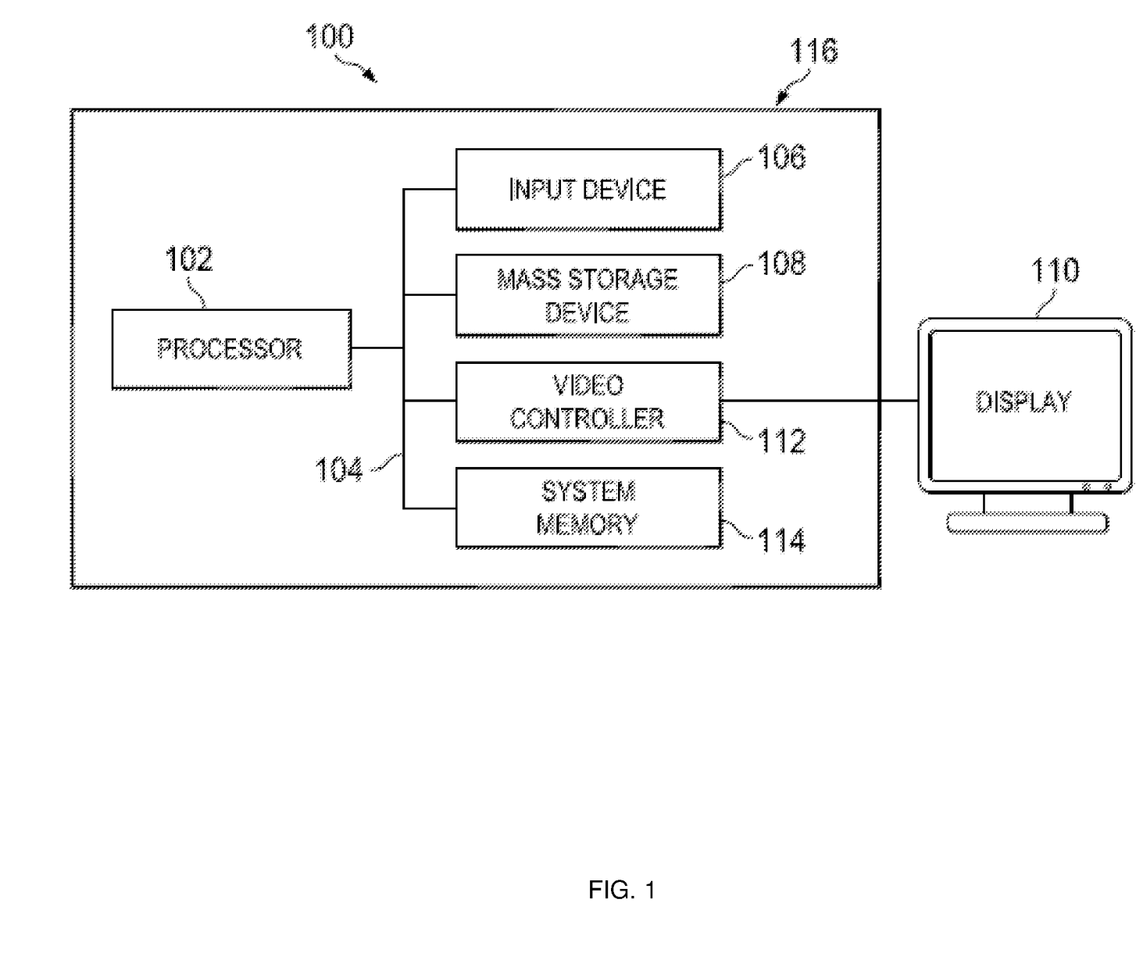
FIG. 1 is a schematic view illustrating an embodiment of an Information Handling System.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
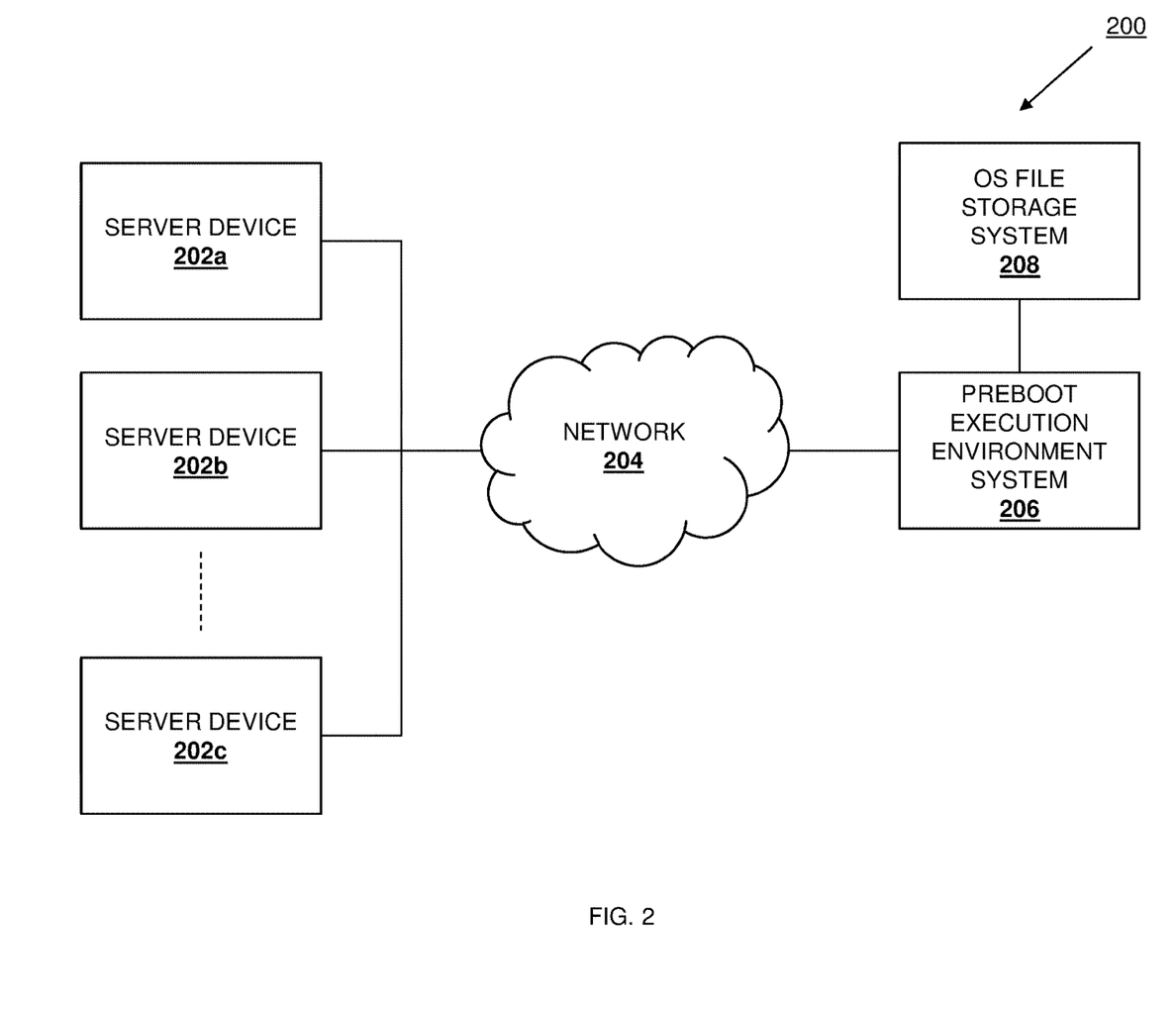
FIG. 2 is a schematic view illustrating an embodiment of a UEFI boot mode OS provisioning system.

Referring now to FIG. 2, an embodiment of a Universally Extensible Firmware Interface (UEFI) boot mode operating system (OS) provisioning system 200 is illustrated. In the illustrate embodiment, the UEFI boot mode OS provisioning system 200 includes a plurality of server devices 202a, 202b, and up to 202c, any or all of which may be provided by the IHS 100 discussed above with reference to FIG. 1, and/or which may include some or all of the components of the IHS 100. While illustrated and described as server devices, networking devices (e.g., switches, routers, etc.), desktop computing devices, laptop/notebook computing devices, tablet computing devices, mobile phones, and/or a variety of other computing devices may benefit from the teachings of the present disclosure and thus are envisioned as falling within its scope as well. Each of the server devices 202a-c is coupled to a network 204. While one of skill in the art in possession of the present disclosure will recognize that the network 204 is described below as being provided by a Local Area Network (LAN), other networks (e.g., the Internet) may be utilized while remaining within the scope of the present disclosure as well.

In the illustrated embodiment, a Pre-boot eXecution Environment (PXE) system 206 is coupled to the network 204. As would be understood by one of skill in the art in possession of the present disclosure, the PXE system 206 may include one or more servers that provide a client/server environment (with the server devices 202a-c acting as the clients, and the PXE system 206 acting as the server in the illustrated embodiment) that is configured to allow the server devices 202a-c to receive a software assembly from the PXE system 206 through the network 204 and boot from that software assembly. As such, in order to boot, the server devices 202a-c only require a PXE capable Network Interface Controller (NIC), along with a relatively small set of industry-standard network protocols (e.g., the Dynamic Host Configuration Protocol (DHCP), the Trivial File Transfer Protocol (TFTP), etc.) While one of skill in the art will recognize that the PXE is a common option for operating system booting, installation, and deployment, other network-based boot enablement systems utilized with UEFI-enabled computing devices may benefit from the teachings of the present disclosure and thus will fall within its scope as well. The PXE system 206 is coupled to an OS file storage system 208 that may be provided by, for example, a TFTP OS file server or other OS file storage system that would be apparent one of skill in the art in possession of the present disclosure.

As discussed below, the PXE system 206 may be configured to deploy or otherwise provision operating systems to network-connected server devices via a legacy BIOS-based boot mode, and any or all of the server devices 202a-c may be configured according to the teachings of the present disclosure to operate in a UEFI boot mode while also enabling the PXE system 206 operating in the legacy BIOS-based boot mode to provision operating systems on those server devices 202a-c. In order to enable such functionality, the OS file storage system 208 may be provided with UEFI boot information such as, for example, a UEFI boot mode OS installer, UEFI operating system images, and/or other UEFI boot information that would be apparent to one of skill in the art in possession of the present disclosure, and the PXE system 206 may be configured to retrieve that UEFI boot information from the OS file storage system 208 in the same manner as the PXE system 206 would retrieve legacy BIOS boot information from an OS file storage system such as a TFTP file server. While a specific UEFI boot mode OS provisioning system 200 has been described, one of skill in the art in possession of the present disclosure will recognize that UEFI boot mode OS provisioning systems may include other devices and/or other device configurations while remaining within the scope of the present disclosure as well.

Figure 3:
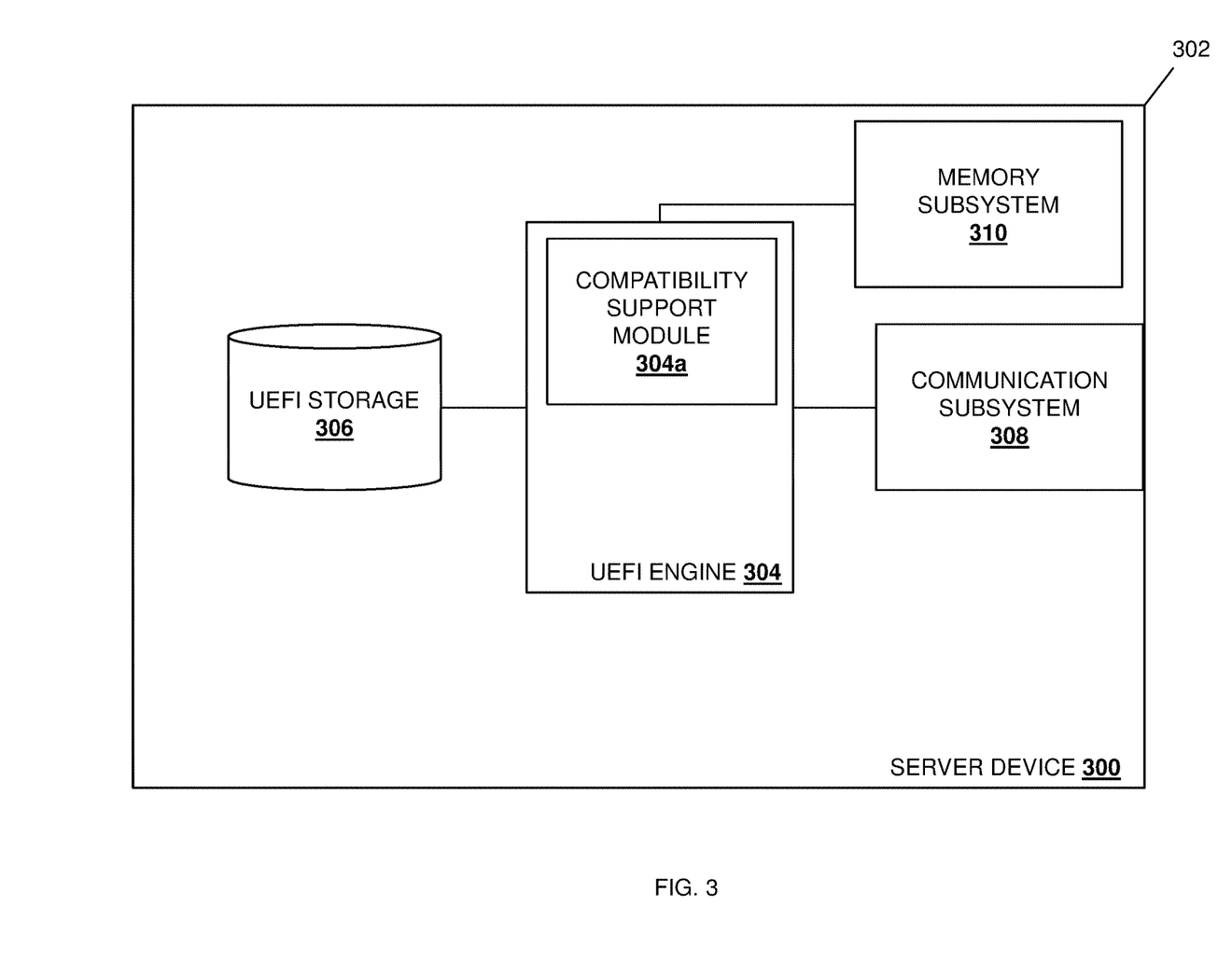
FIG. 3 is a schematic view illustrating an embodiment of a server device included in the UEFI boot mode OS provisioning system.

Referring now to FIG. 3, an embodiment of a server device 300 is illustrated that may be any of the server devices 202a-c discussed above with reference to FIG. 2. As such, the server device 300 may be provided by the IHS 100 discussed above with reference to FIG. 1, and/or may include some or all of the components of the IHS 100. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a UEFI engine 304 that is configured to perform the functions of the UEFI engines and server devices discussed below. In an embodiment, the UEFI engine 304 may be provided by UEFI firmware (e.g., a combination of the processing system and memory system discussed above) that is configured according to the UEFI specification, as well as with the additional functionality discussed below, to provide an interface between an operating system and server firmware and/or other hardware in the server device 300.

In the illustrated embodiment, the UEFI engine 304 includes (or is configured to enable the functionality of) a legacy BIOS compatibility support module 304a. In some examples, the legacy BIOS compatibility support module 304a utilized by the UEFI engine 304 of the present disclosure may be a conventional compatibility support module that is provided on conventional UEFI firmware implementations to provide legacy BIOS compatibility in order to support booting by computing devices in a legacy BIOS boot mode. For example, such legacy BIOS boot mode support may include booting from a Master Boot Record (MBR)-partitioned storage device (e.g., by ignoring the partition table and relying on the content of a boot sector), booting from Globally Unique IDentifier (GUID) Partition Table (GPT) storage devices, allowing option Read Only Memory (ROM) to be used that does not support UEFI, providing legacy System Management Mode (SMM) functionality, and/or performing a variety of other legacy BIOS boot mode operations that would be apparent to one of skill in the art in possession of the present disclosure. However, as discussed below, the UEFI engine 304 may be configured to only load a portion of that conventional legacy BIOS compatibility support module, discussed below, that allows the server device 300 operating in a UEFI boot mode to perform legacy BIOS communications with the PXE system 206 while that PXE system is operating in the legacy BIOS boot mode. However, while the legacy BIOS compatibility support module 304a has been described as a conventional legacy BIOS compatibility support module (provided by conventional UEFI firmware) that may have only portions of its functionality enable by the UEFI engine 304, that functionality may be provided by a non-conventional compatibility support module while remaining within the scope of the present disclosure as well.

The chassis 302 may also house a UEFI storage 306 that is coupled to the UEFI engine 304 (e.g., via a coupling between the processing system and the UEFI storage 306). While illustrated as separate, one of skill in the art in possession of the present disclosure will recognize that the UEFI storage 306 may be provided by a database or other data structure that is included in the UEFI firmware while remaining within the scope of the present disclosure. As discussed below, the UEFI storage 306 may store a setup option, hidden attribute, or other boot option element that allows the UEFI/legacy-BIOS boot mode of the present disclosure to be enabled, although the storage of other data and/or information in the UEFI storage 306 will fall within the scope of the present disclosure as well. For example, a setup option that enables the UEFI/legacy-BIOS boot mode of the present disclosure may be provided as an attribute that is stored in a Serial Peripheral Interface (SPI) flash device that provides the UEFI storage 306. As such, in some embodiments, the setup option that enables the UEFI/legacy-BIOS boot mode of the present disclosure may be activated by a user of the server device 300.

In another example, a hidden attribute that enables the UEFI/legacy-BIOS boot mode of the present disclosure may be an attribute that may be activated by a manufacturer of the server device 300 (or other computing device) during a Custom Factory Integration (CFI) phase for the server device 300, and that is not visible to, and may not be activated by, a user of the server device 300. As such, in some embodiments, the hidden attribute that enables the UEFI/legacy-BIOS boot mode of the present disclosure may be activated only by a manufacturer of the server device 300 during manufacture of the server device 300. As discussed below, the UEFI storage 306 may include PXE legacy option ROMs (e.g., stored in an SPI flash device that provides the UEFI storage 306) if the communication subsystem 308 discussed below is integrated or embedded on the motherboard in the server device 300

The chassis 302 may also house a communication subsystem 308 that is coupled to the UEFI engine 304 (e.g., via a coupling between the processing system and the communication subsystem 308) and that, in the embodiments illustrated and discussed below, is provided by a PXE-enabled Network Interface Controller (NIC) that may be configured to communicate with the PXE system 206 (e.g., via DHCP, TFTP, etc.). As discussed below, the communication subsystem 308 may include Peripheral Component Interconnect (PCI) Interrupt ReQuest (IRQ) settings and, in some embodiments, PXE legacy option ROMs (e.g., if the communication subsystem 308 is an add-in device such as an add-in PCI device connected to a motherboard in the server device 300 via a connector.) However, other communication subsystems and/or components (e.g., wireless communication subsystems such as BLUETOOTH®, Near Field Communication (NFC), etc.) may be utilized to provide the communications subsystem while remaining within the scope of the present disclosure.

The chassis 302 may also house a memory subsystem 310 that is coupled to the UEFI engine 304 (e.g., via a coupling between the processing system and the memory subsystem 310), and that may be provided by Dual Inline Memory Modules (DIMMs) and/or other memory devices that would be apparent to one of skill in the art in possession of the present disclosure. As discussed below, the memory subsystem 310 may include Interrupt Vector Tables (IVTs). While a specific server device 300 has been illustrated and described, one of skill in the art in possession of the present disclosure will recognize that server devices may include different components and/or component configurations for providing conventional server device functionality, as well as the functionality discussed below, while remaining within the scope of the present disclosure as well.

Figure 4:
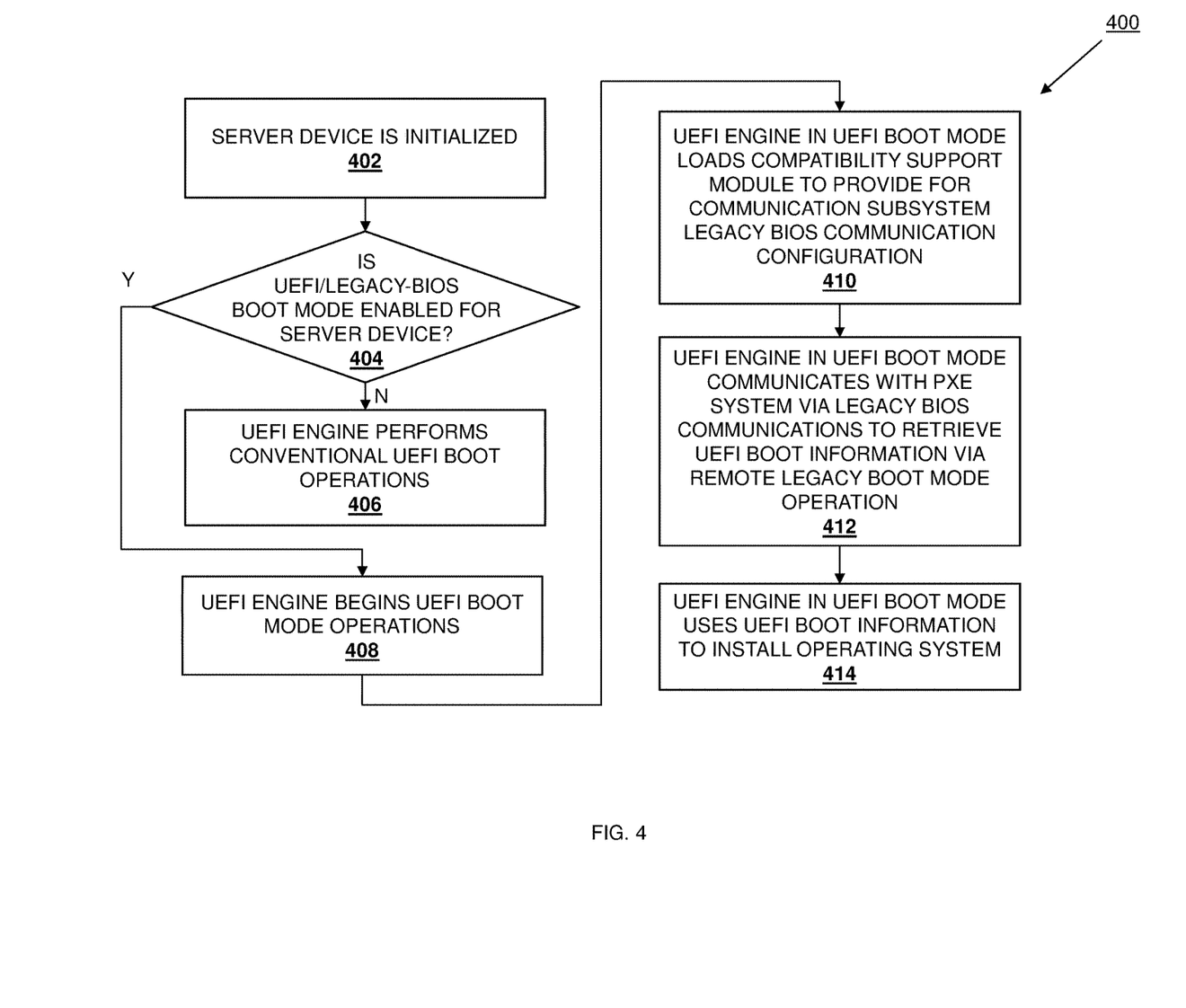
FIG. 4 is a flow chart illustrating an embodiment of a method for providing an operating system on a server device in a UEFI boot mode.

Referring now to FIG. 4, an embodiment of a method 400 for providing an operating system on a server device in a UEFI boot mode is illustrated. As discussed below, the systems and methods of the present disclosure may provide for the implementation of a user activated UEFI/legacy-BIOS boot mode setup option or a manufacturer activated UEFI/legacy-BIOS boot mode hidden attribute in a server device. When that setup option or hidden attribute is enabled in a server device that is configured to operate in a UEFI boot mode, the server device may retrieve and deploy UEFI boot mode operating system images from a PXE system that is configured to operate in a remote legacy BIOS boot mode. As discussed below, the detection of the enabled UEFI/legacy-BIOS boot mode may result in a UEFI engine in the server device performing partial loading of a legacy BIOS compatibility support module, which provides for the configuration of a communication subsystem in the server device to communicate with the PXE system via legacy BIOS communications (e.g., via the IVT setup, PCI IRQ settings provisioning, and PXE legacy option ROM loading discussed below). The UEFI engine in the server device is then configured to boot to the PXE system operating in the legacy BIOS boot mode, with that PXE system performing conventional DHCP operations, UEFI boot information retrieval (e.g., retrieval of a UEFI boot mode OS installer from a TFTP OS file server), and UEFI boot information provisioning to the UEFI engine such that the UEFI engine may use the UEFI boot information to install an OS on the server device. As such, PXE systems that are configured to operate in a legacy BIOS boot mode may provision operating systems to server devices that are configured to operate in a UEFI boot mode "out-of-the-box", i.e., without modification to the PXE system or server device once it is received from the manufacturer (e.g., when the UEFI/legacy-BIOS boot mode hidden attribute has been enabled by the manufacturer), or only with the need to activate the UEFI/legacy-BIOS boot mode setup option by the user.

The method 400 begins at block 402 where a server device is initialized. In an embodiment, at or prior to block 402 the UEFI/legacy-BIOS boot mode of the present disclosure may be enabled in the server device 202a/300. For example, as discussed above, the UEFI storage 306 in the server device 202a/300 may store a setup option, hidden attribute, or other boot option element that allows the UEFI/legacy-BIOS boot mode of the present disclosure to be enabled. In one example, the UEFI/legacy-BIOS boot mode setup option of the present disclosure may be an attribute that is stored in a Serial Peripheral Interface (SPI) flash device that provides the UEFI storage 306, and may be activated by a user of the server device 300 at or before block 402 (e.g., upon receiving the server device 202a/300 from the manufacturer of the server device 202a/300.) In another example, the UEFI/legacy-BIOS boot mode hidden attribute of the present disclosure may be an attribute that is not visible to (and may not be activated by) a user of the server device 202a/300, and may be activated by a manufacturer of the server device 300 during a Custom Factory Integration (CFI) phase for the server device 202a/300 and prior to providing the server device 202a/300 to the user. As such, the initialization of the server device 202a/300 at block 402 may include an initial power-on of the server device 202a/300 by the user (e.g., the first power-on of the server device 202a/300 by the user after receiving the server device from the manufacturer and connecting the server device 202a/300 to the network 204), or a power-on of the server device 202a/300 by the user subsequent to the user performing operations to activate the UEFI/legacy-BIOS boot mode setup option for the server device 202a/300. However, resets, reboots, and/or other initialization operations that would be apparent to one of skill in the art in possession of the present disclosure may be performed at block 402 while falling within its scope as well.

The method 400 then proceeds to decision block 404 where it is determined whether a UEFI/legacy-BIOS boot mode is enabled for the server device. In an embodiment, at decision block 404, the UEFI engine 304 in the server device 202a/300 operates to determine whether the UEFI/legacy-BIOS boot mode is enabled for the server device 202a/300. For example, the UEFI engine 304 may access the UEFI storage 306 to determine whether the UEFI/legacy-BIOS boot mode hidden attribute was previously activated by the manufacturer of the server device 202a/300 as discussed above, whether the UEFI/legacy-BIOS boot mode setup option was previously activated by a user of the server device 202a/300 as discussed above, whether the UEFI/legacy-BIOS boot mode is enabled as a default boot mode for the server device 202a/300, etc. If, at decision block 404, it is determined that the UEFI/legacy-BIOS boot mode is not enabled for the server device 202a/300, the method 400 proceeds to block 406 where the UEFI engine 304 performs conventional UEFI boot operations. Conventional UEFI boot operations that may be performed at block 406 are known in the art and thus are not described herein in detail, and one of skill in the art in possession of the present disclosure will recognize that those conventional UEFI boot operations would fail if performed with a conventional PXE system that was configured to perform legacy BIOS boot operations.

If, at decision block 404, it is determined that the UEFI/legacy-BIOS boot mode is enabled for the server device, the method 400 proceeds to block 406 where the UEFI engine begins a UEFI boot mode. In an embodiment, at block 408, the UEFI engine 304 begins UEFI boot mode operations. As described herein, the UEFI engine 304 of the server device 202a/300 is configured to operate in a UEFI boot mode, and as will be appreciated by one of skill in the art in possession of the present disclosure, the UEFI engine 304 may operate to perform conventional UEFI boot mode operations while performing blocks 410, 412, and/or 414 of the method 400. As such, while blocks 410, 412, and/or 414 may describe the UEFI/legacy-BIOS boot mode operations of the present disclosure that include non-conventional UEFI boot mode operations, the UEFI engine 304 and server device 202a/300 are configured to operate in a UEFI boot mode that is supplemented by the UEFI/legacy-BIOS boot mode operations of the present disclosure to enable the OS provisioning via the PXE system operating in the legacy BIOS boot mode. As such, the UEFI engine 304 and/or server device 202a/300 are considered to be operating in the UEFI boot mode while performing the UEFI/legacy-BIOS boot mode operations of the present disclosure (e.g., as opposed to operating only in a legacy BIOS boot mode as would be enabled by a conventional legacy-BIOS compatibility support module provided by conventional UEFI firmware.)

The method 400 then proceeds to block 410 where the UEFI engine in the UEFI boot mode loads a compatibility support module to provide for the legacy BIOS communication configuration of a communication subsystem. In an embodiment, at block 410, the UEFI engine 304 may operate to load, activate, or otherwise enable the compatibility support module 304a. For example, as discussed above, the compatibility support module 304a may be provided by a conventional legacy-BIOS compatibility support module that is included on conventional UEFI firmware implementations to provide legacy BIOS compatibility in order to support booting by computing devices in a legacy BIOS boot mode. In such examples, the UEFI engine 304 may be configured to only load a portion of that conventional legacy BIOS compatibility support module (e.g., a minimal compatibility support module footprint) that enables the remote legacy BIOS boot mode operations with the PXE system 206 discussed below. For example, in embodiments where the conventional legacy BIOS compatibility support module is utilized, the UEFI engine 304 may prevent the loading of a testing portion of the conventional legacy BIOS compatibility support module that is configured to perform compatibility support module testing operations (e.g., to test sub-modules in the compatibility support module.) Furthermore, one of skill in the art in possession of the present disclosure will recognize that other portions of a conventional legacy BIOS compatibility support module may be unnecessary to achieve the functionality discussed below, and thus may be prevented from loading in a similar manner while remaining within the scope of the present disclosure. However, in other embodiments, a non-conventional legacy BIOS compatibility support module may be loaded, activated, or otherwise enabled at block 410 that provides for the functionality discussed below while remaining within the scope of the present disclosure.

In an embodiment, the loading of the portion of the conventional legacy BIOS compatibility support module may result in the loaded portion of the conventional legacy BIOS compatibility support module providing for the configuration of the communication subsystem 308 to communicate with the PXE system 206 via legacy BIOS communications by configuring at least one Interrupt Vector Table (IVT) in the memory subsystem 310. As would be understood by one of skill in the art, IVTs may be configured to provide for interrupt(s) for subsystems (e.g., a NIC in the communication subsystem 308, a timer in the server device 202a/300, a keyboard coupled to the server device 202a/300, a mouse coupled to the server device 202a/300, a serial port on the server device 202a/300 (e.g., if redirection is needed), etc.) in the server device 202a/300 during remote legacy BIOS boot mode operations performed with the PXE system 206. In another embodiment, the loading of the portion of the conventional legacy BIOS compatibility support module may result in the loaded portion of the conventional legacy BIOS compatibility support module providing for the configuration of the communication subsystem 308 to communicate with the PXE system 206 via legacy BIOS communications by configuring at least one Peripheral Component Interconnect (PCI) Interrupt ReQuest (IRQ) setting in the communication subsystem 308 (e.g., in a NIC included in the communication subsystem 308). As would be understood by one of skill in the art, PCI IRQ settings may be configured to provide for communication by a NIC in the communication subsystem 308 with the PXE system 206 operating in a legacy BIOS boot mode by, for example, providing hardware signal that may be sent to a processor to cause running programs to be temporarily stopped in order to allow an interrupt handler to service a request from a PCI device, and/or perform other PCI IRQ setting functionality that would be apparent to one of skill in the art in possession of the present disclosure.

In another embodiment, the loading of the portion of the conventional legacy BIOS compatibility support module may result in the loaded portion of the conventional legacy BIOS compatibility support module providing for the configuration of the communication subsystem 308 to communicate with the PXE system 206 via legacy BIOS communications by configuring at least one PXE option Read-Only Memory (ROM) in the communication subsystem 308 or the UEFI storage 306. As discussed above, the PXE legacy option ROMs that are configured at block 410 may be stored in the UEFI storage 306 (e.g., stored in an SPI flash device that provides the UEFI storage 306) if the communication subsystem 308 (e.g., a NIC) in the server device 202a/300 is integrated or embedded on the motherboard in the server device 300, and may be stored in the communication subsystem 308 (e.g., a NIC) if the communication subsystem 308 is an add-in device such as an add-in PCI device connected to a motherboard in the server device 300 via a connector. As would be understood by one of skill in the art, PXE legacy option ROMs may be configured to provide a network stack for communicating with the PXE system 206 operating in a legacy BIOS boot mode, performing legacy BIOS boot mode operations, performing operating system file downloads, and/or performing other PXE-legacy-option-ROM-enabled actions that would be apparent to one of skill in the art in possession of the present disclosure. While a few specific examples of the loaded portion of the conventional legacy BIOS compatibility support module providing for the configuration of the communication subsystem 308 to communicate with the PXE system 206 via legacy BIOS communications have been described, one of skill in the art in possession of the present disclosure will understand that a PXE system configured to operate in a legacy BIOS boot mode will only be able to communicate with server device NICs via legacy BIOS communications, and thus will recognize that other subsystems in the server device may be configured to enable the UEFI boot mode server device/legacy BIOS boot mode PXE system communication functionality described herein while remaining within the scope of the present disclosure.

The method 400 then proceeds to block 412 where the UEFI engine in the UEFI boot mode communicates with a PXE system via legacy BIOS communications to retrieve UEFI boot information via a remote legacy BIOS boot mode operation. In the examples provided below, the UEFI boot information includes a UEFI boot mode OS installer, although other UEFI boot information (e.g., UEFI OS images) may fall within the scope of the present disclosure as well. In an embodiment, at block 412, the UEFI engine 304 may operate to transmit legacy BIOS communications via the communication subsystem 308 and through the network 204 with the PXE system 206 in order to cause the PXE system 206 to perform remote legacy BIOS boot mode operation(s) to retrieve the UEFI boot information. For example, at block 412, the BIOS engine 304 operating in the UEFI boot mode may call a Bootstrap Entry Vector (BEV) for the PXE system 206, which one of skill in the art will recognize is a legacy BIOS communication tool that enables a server device NIC to perform a network boot with the PXE system operating in a legacy BIOS boot mode, and is not conventionally utilized by server devices operating in a UEFI boot mode.

In another example, at block 412, the BIOS engine 304 may use the PXE legacy option ROMs that were configured in the communication subsystem 308 or the UEFI storage 306 to perform a legacy BIOS boot mode operation that provides for booting from the PXE system 206 operating in the legacy BIOS boot mode. In a specific example, the PXE legacy option ROMs may include code that provides the Bootstrap Entry Vector that is configured to download UEFI boot information (e.g., an operating system image), and the execution of that code will involve network packet transfers (e.g., using a NIC in the communication subsystem 308) that may require interrupts on some NICs (although some NICs may utilized polling methods rather than interrupts.) In another example, at block 412, the BIOS engine 304 may use the Bootstrap Entry Vector to perform DHCP communications with the PXE system 202a/300 operating in the legacy BIOS boot mode (e.g., receiving DHCP offers from the PXE system 202a/300, receiving an Internet Protocol (IP) address from the PXE system 202a/300, and/or performing other DHCP communications that would be apparent to one of skill in the art in possession of the present disclosure.) In a specific example, if a NIC utilizes interrupts for network package transactions as discussed above, the IRQs and IVTs may be utilized, with the IVTs containing the interrupt handlers that map to corresponding IRQ numbers.

In another example, at block 412, the BIOS engine 304 may use the Bootstrap Entry Vector to download or otherwise retrieve UEFI boot information from the PXE system 206 through the network 204 and via the communication subsystem 308, and may store that UEFI boot information in the memory subsystem 310. In a specific example, the use of the Bootstrap Entry Vector to download or otherwise retrieve UEFI boot information from the PXE system 206 may include legacy BIOS communications that cause the PXE system 206 to perform remote legacy BIOS boot mode operations that access the OS file storage system 208 to retrieve the UEFI boot information. As described above, the OS file storage system 208 may be a TFTP OS file server that conventionally stores legacy BIOS boot information (e.g., legacy BIOS OS installers) when the PXE system is configured to operate in a legacy BIOS boot mode, but that has been modified to store UEFI boot information (e.g., UEFI OS installers). As such, the PXE system 206 may retrieve the UEFI boot information at block 412 in substantially the same manner as it would in performing remote legacy BIOS boot mode operations to retrieve legacy BIOS boot information in conventional legacy BIOS boot mode systems, and may provide that UEFI boot information through the network 204 to the server device 202a/300 in substantially the same manner as it would in performing remote legacy BIOS boot mode operations to provide legacy BIOS boot information through a network in conventional legacy BIOS boot mode systems.

The method 400 then proceeds to block 414 where the UEFI engine in the UEFI boot mode uses the UEFI boot information to install an operating system. In an embodiment, at block 414, the UEFI engine 304 uses the BIOS boot information retrieved via the PXE system 206 at block 412 to install an operating system on the server device 202a. For example, as discussed above, the UEFI boot information may be a UEFI OS installer, and at block 414 the UEFI OS installer may be executed to install an operating system on the server device 202a/300. However, one of skill in the art in possession of the present disclosure will recognize that UEFI boot mode OS images and/or other UEFI boot information may be retrieved at block 412 and utilized at block 414 to install an operating system on the server device 202a/300 while remaining within the scope of the present disclosure. Following block 414, the server device 202a/300 may utilize the operating system installed at block 414 (e.g., upon a reboot, restart, or other initialization) to operate in a runtime environment as is known in the art.

Thus, the systems and methods of the present disclosure provide for the implementation of a UEFI/legacy-BIOS boot mode in a server device, which is configured to operate in a UEFI boot mode, in order to allow the server device to retrieve and deploy UEFI boot mode operating system information from a PXE system that is configured to operate in a remote legacy BIOS boot mode. The UEFI/legacy-BIOS boot mode may provide for the performance, by a UEFI engine in the server device, of a partial loading of a legacy BIOS compatibility support module and a resulting configuration of a communication subsystem in the server device to communicate with the PXE system via legacy BIOS communications (e.g., via the IVT setup, PCI IRQ settings provisioning, and PXE legacy option ROM loading discussed above). The UEFI engine in the server device may then utilize legacy BIOS communications to boot to the PXE system operating in the legacy BIOS boot mode, with that PXE system performing conventional DHCP operations and the provisioning of UEFI boot information (e.g., a UEFI boot mode OS installer) to the UEFI engine such that the UEFI engine may use the UEFI boot information to install an OS on the server device. As such, PXE systems that are configured to operate in a legacy BIOS boot mode may provision operating systems to server devices that are configured to operate in a UEFI boot mode with little to no intervention by the user (e.g., on an "out-of-the-box" server device.)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Universally Extensible Firmware Interface (UEFI) boot mode operating system provisioning system, comprising:
a pre-boot execution environment system; and
a server device that is coupled to the pre-boot execution environment system through a network, wherein the server device is configured to:
boot in a Universally Extensible Firmware Interface (UEFI) boot mode;
load, while in the UEFI boot mode, a portion of a legacy Basic Input/Output System (BIOS) compatibility support module, wherein the portion of the legacy BIOS compatibility support module provides for the configuration of a communication subsystem in the server device to communicate with the pre-boot execution environment system via legacy BIOS communications;
communicate, with the pre-boot execution environment system via the legacy BIOS communications using the communication subsystem and while in the UEFI boot mode, to retrieve UEFI boot information via a remote legacy BIOS boot mode operation; and
install, using the UEFI boot information and while in the UEFI boot mode, an operating system on the server device.

2. The system of claim 1, wherein the server device is configured to:
determine that a UEFI/legacy-BIOS boot mode is enabled and, in response, load the portion of the legacy BIOS compatibility support module.

3. The system of claim 1, wherein the loading of the portion of the legacy BIOS compatibility support module includes preventing the loading of a testing portion of the compatibility support module that is configured to perform compatibility support module testing operations.

4. The system of claim 1, wherein the configuration of the communication subsystem in the server device to communicate with the pre-boot execution environment system via legacy BIOS communications includes configuring at least one Interrupt Vector Table in the server device to provide at least one interrupt for at least one subsystem in the server device during the remote legacy BIOS boot mode operation.

5. The system of claim 1, wherein the configuration of the communication subsystem in the server device to communicate with the pre-boot execution environment system via legacy BIOS communications includes configuring at least one Peripheral Component Interconnect (PCI) Interrupt ReQuest (IRQ) setting in the communication subsystem.

6. The system of claim 1, wherein the configuration of the communication subsystem in the server device to communicate with the pre-boot execution environment system via legacy BIOS communications includes configuring at least one pre-boot execution environment option Read Only Memory (ROM) in the server device.

7. An Information Handling System (IHS), comprising:
a processing system; and
a memory system that is coupled to the processing system and that includes instructions that, when executed by the processing system, cause the processing system to provide a Universally Extensible Firmware Interface (UEFI) engine that is configured to:
boot in a UEFI boot mode;

load, while in the UEFI boot mode, a portion of a legacy Basic Input/Output System (BIOS) compatibility support module, wherein the portion of the legacy BIOS compatibility support module provides for the configuration of a communication subsystem to communicate with a pre-boot execution environment system via legacy BIOS communications;

communicate, with the pre-boot execution environment system via the legacy BIOS communications using the communication subsystem and while in the UEFI boot mode, to retrieve UEFI boot information via a remote legacy BIOS boot mode operation; and install, using the UEFI boot information and while in the UEFI boot mode, an operating system.

8. The IHS of claim 7, wherein the UEFI engine is configured to:

determine that a UEFI/legacy-BIOS boot mode is enabled and, in response, load the portion of the legacy BIOS compatibility support module.

9. The IHS of claim 7, wherein the loading of the portion of the legacy BIOS compatibility support module includes preventing the loading of a testing portion of the compatibility support module that is configured to perform compatibility support module testing operations.

10. The IHS of claim 7, wherein the configuration of the communication subsystem to communicate with the pre-boot execution environment system via legacy BIOS communications includes configuring at least one Interrupt Vector Table to provide at least one interrupt for at least one subsystem during the remote legacy BIOS boot mode operation.

11. The IHS of claim 7, wherein the configuration of the communication subsystem to communicate with the pre-boot execution environment system via legacy BIOS communications includes configuring at least one Peripheral Component Interconnect (PCI) Interrupt ReQuest (IRQ) setting in the communication subsystem.

12. The IHS of claim 7, wherein the configuration of the communication subsystem to communicate with the pre-boot execution environment system via legacy BIOS communications includes configuring at least one pre-boot execution environment option Read Only Memory (ROM).

13. The IHS of claim 7, wherein the communicating with the pre-boot execution environment system via the legacy BIOS communications using the communication subsystem and while in the UEFI boot mode is performed using a Bootstrap Entry Vector.

14. A method for providing an operating system on a server device in a Universally Extensible Firmware Interface (UEFI) boot mode, comprising:

booting, by a computing device, in a UEFI boot mode;

loading, by the computing device while in the UEFI boot mode, a portion of a legacy Basic Input/Output System (BIOS) compatibility support module, wherein the portion of the legacy BIOS compatibility support module provides for the configuration of a communication subsystem in the computing device to communicate with a pre-boot execution environment system via legacy BIOS communications;

communicating, by the computing device with the pre-boot execution environment system via the legacy BIOS communications using the communication subsystem and while in the UEFI boot mode, to retrieve UEFI boot information via a remote legacy BIOS boot mode operation; and installing, by the computing device using the UEFI boot information and while in the UEFI boot mode, an operating system on the computing device.

15. The method of claim 14, further comprising:

determining, by the computing device, that a UEFI/legacy-BIOS boot mode is enabled and, in response, loading the portion of the legacy BIOS compatibility support module.

16. The method of claim 14, wherein the configuration of the communication subsystem in the computing device to communicate with the pre-boot execution environment system via legacy BIOS communications includes configuring at least one Interrupt Vector Table in the computing device to provide at least one interrupt for at least one subsystem in the computing device during the remote legacy BIOS boot mode operation.

17. The method of claim 14, wherein the configuration of the communication subsystem in the computing device to communicate with the pre-boot execution environment system via legacy BIOS communications includes configuring at least one Peripheral Component Interconnect (PCI) Interrupt ReQuest (IRQ) setting in the communication subsystem.

18. The method of claim 14, wherein the configuration of the communication subsystem in the computing device to communicate with the pre-boot execution environment system via legacy BIOS communications includes configuring at least one pre-boot execution environment option Read Only Memory (ROM) in the computing device.

19. The method of claim 14, wherein the communicating with the pre-boot execution environment system via the legacy BIOS communications using the communication subsystem and while in the UEFI boot mode is performed using a Bootstrap Entry Vector.

20. The method of claim 14, wherein the loading of the portion of the legacy BIOS compatibility support module includes preventing the loading of a testing portion of the compatibility support module that is configured to perform compatibility support module testing operations.

* * * * *